US012567911B2

(12) United States Patent
Hosamane et al.

(10) Patent No.: US 12,567,911 B2
(45) Date of Patent: Mar. 3, 2026

(54) SYSTEMS, DEVICES, AND METHODS FOR DATA TRANSMISSION

(71) Applicant: Honeywell International Inc., Charlotte, NC (US)

(72) Inventors: Somashekhar Hosamane, Bangalore (IN); Vadiraja Gopady Krishna Upadya, Bangalore (IN); Sudheendra K N, Bangalore (IN); Deepak Kumar J, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 570 days.

(21) Appl. No.: 18/059,525

(22) Filed: Nov. 29, 2022

(65) Prior Publication Data

US 2024/0080108 A1 Mar. 7, 2024

(30) Foreign Application Priority Data

Sep. 7, 2022 (IN) .............................. 202211051077

(51) Int. Cl.
H04L 9/40 (2022.01)
H04B 11/00 (2006.01)
(52) U.S. Cl.
CPC .......... H04B 11/00 (2013.01); H04L 63/0428 (2013.01)

(58) Field of Classification Search
None
See application file for complete search history.

(56) References Cited

U.S. PATENT DOCUMENTS

| | | | | |
|---|---|---|---|---|
| 11,006,277 | B2 * | 5/2021 | Thompson | .......... H04W 12/068 |
| 2013/0197739 | A1 * | 8/2013 | Gallagher | ................. B64F 5/60 |
| | | | | 701/31.5 |
| 2019/0206152 | A1 * | 7/2019 | Du | ............................ B64F 5/40 |
| 2021/0288825 | A1 * | 9/2021 | Chikkala | ............. H04M 3/5183 |
| 2024/0384664 | A1 * | 11/2024 | Vez | ........................... B64F 5/60 |

\* cited by examiner

*Primary Examiner* — Nelson S. Giddins
(74) *Attorney, Agent, or Firm* — ALSTON & BIRD LLP

(57) ABSTRACT

A system may comprise a plurality of subsystems, each including an encoder, a transmitter configured to transmit ultrasonic signals, a receiver configured to receive ultrasonic signals, and a local memory. Each subsystem may be configured to: encrypt data relating to first subsystem status of the subsystem; encode, using the encoder, the encrypted data relating to the first subsystem status to an ultrasonic signal; transmit, using the transmitter, the ultrasonic signal relating to the first subsystem status to other subsystems of the plurality of subsystems; receive, using the receiver, one or more signals from each of the other subsystems of the plurality of subsystems, the one or more signals relating to other subsystem statuses of the other of the plurality of subsystems; store, in the local memory, the received one or more signals; and transfer, to a server, data regarding the first subsystem status and the other subsystem statuses.

20 Claims, 9 Drawing Sheets

300

500

502 — RECEIVE ENCODED ULTRASONIC DATA RELATED TO ANOTHER SUBSYSTEM

504 — STORE ENCODED DATA RECEIVED ULTRASONICALLY

600

602 — DECODE DATA PERTAINING TO OTHER SUBSYSTEM

604 — UPLOAD DATA PERTAINING TO OTHER SUBSYSTEM TO CENTRALIZED LOCATION

SYSTEMS, DEVICES, AND METHODS FOR DATA TRANSMISSION

CROSS-REFERENCE TO RELATED APPLICATION(S)

This application claims the benefit of priority to Indian Provisional Patent Application No. 202211051077, filed Sep. 7, 2022, the entirety of which is incorporated by reference herein.

TECHNICAL FIELD

Various embodiments of the present disclosure relate generally to the field of data transmission, storage, and dissemination. In particular, the present disclosure relates to systems and methods for ultrasonic transmission of subsystem statuses for storage and dissemination by other subsystems.

BACKGROUND

An environment, such as an aircraft (or other vehicle) or a building/site may include a variety of systems/subsystems that are operable to perform various functions. Some or all of the systems/subsystems may be provided by a single manufacturer or other system provider. For example, an aircraft may include systems/subsystems such as a flight management system ("FMS"), ventilation system, bleed air system, air conditioning system, aircraft environment surveillance system ("AESS"), cabin pressure control system ("CPCS"), supplemental cooling system, auxiliary power unit, or any other system. Other environments (e.g., buildings/sites) may include other types of systems/subsystems.

A manufacturer or other provider may desire to have data for the various systems/subsystems that it provides. For example, the manufacturer or other provider may wish to monitor health/performance data and trends for the systems/subsystems. However, the systems/subsystems may not provide regular updates to the manufacturer or other provider. The systems/subsystems may be analyzed as they come in for repair, overhaul, or maintenance by the manufacturer/provider or a contracted entity that performs the repair or maintenance. However, the systems/subsystems may come to the manufacturer/provider or contracted entity individually, such that health/performance data is only obtainable for the particular system/subsystem that is being serviced. Therefore, a need exists for systems and methods for ultrasonic transmission of subsystem statuses for storage and dissemination by other subsystems.

SUMMARY OF THE DISCLOSURE

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

In an example, a system for data transfer may comprise a plurality of subsystems, each including an encoder, a transmitter configured to transmit ultrasonic signals, a receiver configured to receive ultrasonic signals, and a local memory. Each subsystem of the plurality of subsystems may be configured to: encrypt data relating to first subsystem status of the subsystem; encode, using the encoder, the encrypted data relating to the first subsystem status to an ultrasonic signal; transmit, using the transmitter, the ultrasonic signal relating to the first subsystem status to other subsystems of the plurality of subsystems; receive, using the receiver, one or more signals from each of the other subsystems of the plurality of subsystems, the one or more signals relating to other subsystem statuses of the other of the plurality of subsystems; store, in the local memory, the received one or more signals; and transfer, to a server, data regarding the first subsystem status and the other subsystem statuses.

Any of the examples of this disclosure may include any of the following features, additionally or alternatively. The transmitter may include a speaker. The receiver may include a microphone. Each of the plurality of subsystems also may include a processor configured to execute one or more algorithms in order to filter the received one or more signals. Each subsystem may further include a processor configured to determine whether a first subsystem status is sufficiently critical to be transmitted. Each subsystem may further include a decryption module configured to decrypt the one or more received signals. Each of the plurality of subsystems may be a component of an aircraft. Each of the other of the plurality of subsystems may be configured to receive the ultrasonic signal relating to the first subsystem status.

In another example, a system for data transfer may comprise a first subsystem, including a first encoder and a first transmitter configured to transmit ultrasonic signals; a second subsystem, including a first receiver configured to receive ultrasonic signals, and a first local memory; and a third subsystem, including a second receiver configured to receive ultrasonic signals, and a second local memory. The first subsystem may be configured to encrypt data relating to first subsystem status of the first subsystem; encode, using the first encoder, the encrypted data relating to the first subsystem status to a first ultrasonic signal; and transmit, using the first transmitter, the first ultrasonic signal relating to the first subsystem status. The second subsystem may be configured to receive, using the first receiver, the transmitted first ultrasonic signal relating to the first subsystem status and store, in the first local memory, data relating to the received first ultrasonic signal. The third subsystem may be configured to receive, using the second receiver, the transmitted first ultrasonic signal relating to the first subsystem status and store, in the second local memory, data relating to the received first ultrasonic signal.

Any of the examples disclosed herein may include any of the following features, additionally or alternatively. Each of the second subsystem and the third subsystem may be configured to transfer, to a server, data regarding the first subsystem status. The first subsystem may further include a third receiver configured to receive ultrasonic signals, and a third local memory. The second subsystem may further include a second encoder and a second transmitter configured to transmit ultrasonic signals. The second subsystem may be configured to encrypt data relating to second subsystem status of the second subsystem; encode, using the second encoder, the encrypted data relating to the first subsystem status to an ultrasonic signal; and transmit, using the second transmitter, the ultrasonic signal relating to the second subsystem status. The first subsystem may be configured to receive, using the third receiver, the transmitted second ultrasonic signal relating to the second subsystem status and store, in the third local memory, data relating to the received second ultrasonic signal. The third subsystem may be configured to receive, using the second receiver, the transmitted second ultrasonic signal relating to the second subsystem status and store, in the second local memory, data relating to the received second ultrasonic signal. The first transmitter may include a speaker. Each of the second receiver and the third receiver may include a microphone. Each of the second subsystem and the third subsystem also may include a processor configured to execute one or more algorithms in order to filter the received one or more signals. The first subsystem may further include a processor configured to determine whether a first subsystem status is sufficiently critical to be transmitted. Each of the second system and the third subsystem may further include a decryption module configured to decrypt the one or more received signals. Each of the first subsystem, the second subsystem, and the third subsystem may be a component of an aircraft.

In a further example, a method of data transfer may include encrypting, by a subsystem of a system, data relating to a health or performance status of the subsystem; encoding, by an encoder of the subsystem, the encrypted data relating to the subsystem status to an ultrasonic signal; and transmitting, using a microphone of the subsystem, an ultrasonic signal relating to the subsystem status to a plurality of other subsystems of the system.

Any of the examples disclosed herein may include any of the following features or steps, additionally or alternatively. The subsystem may be a component of an aircraft. The method may further comprise determining whether a first subsystem status is sufficiently critical to be transmitted.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to the field of data transmission, storage, and dissemination. In particular, the present disclosure relates to systems and methods for ultrasonic transmission of subsystem statuses for storage and dissemination by other subsystems. A system may include multiple subsystems. The subsystems may generate data relating to their health and/or performance. Important (e.g., critical) data related to health and/or performance of a subsystem may be encoded and transmitted by the subsystem using ultrasonic frequencies. Transmitters of each of the other subsystems may receive the ultrasonic frequency transmission and store the data in a memory of each of the other subsystems. When any of the subsystems is repaired or maintained, the data stored in the memory may be accessed and uploaded. Thus, a manufacturer or other provider may obtain information about subsystems other than the one currently being repaired/maintained. The manufacturer or other provider may communicate with an entity associated with the system (e.g., an operator of the system, such as an airline), in order to inform them of subsystem health/status/performance and/or request that another subsystem be provided for repairs/maintenance. Because each of the subsystems stores data for the other subsystems, when any one of the subsystems is accessed (e.g., during repair or maintenance of the subsystem), a manufacturer or other provider may obtain information about the other subsystems, as well. The disclosed systems for ultrasonic data transmission may use a combination of sound, software, and hardware devices to create a seamless, reliable, secure, cost-effective, and energy-efficient approach to connectivity.

Figure 1A:
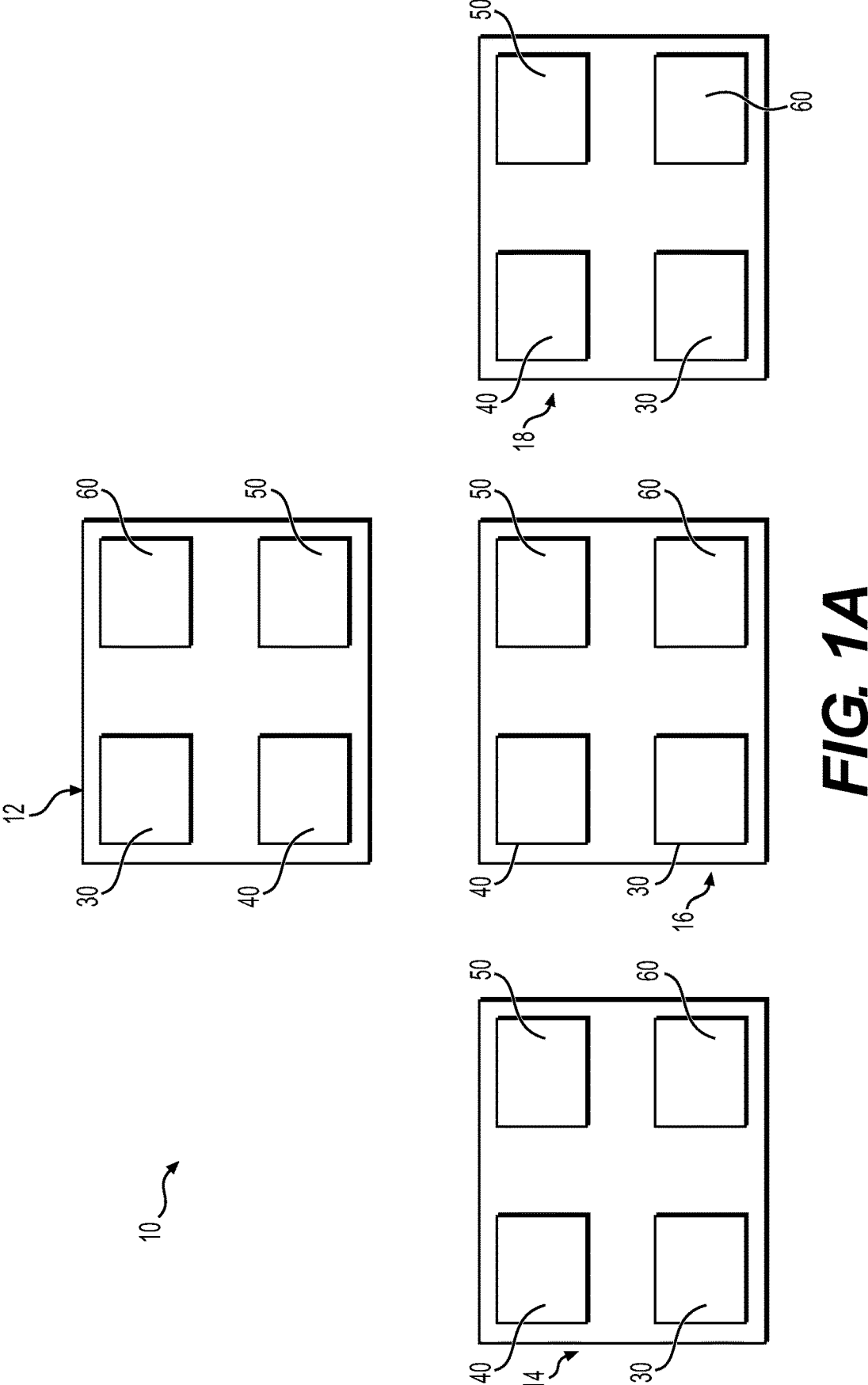
FIG. 1A-1C depict an exemplary system for data transmission and storage.
Figure 1B:
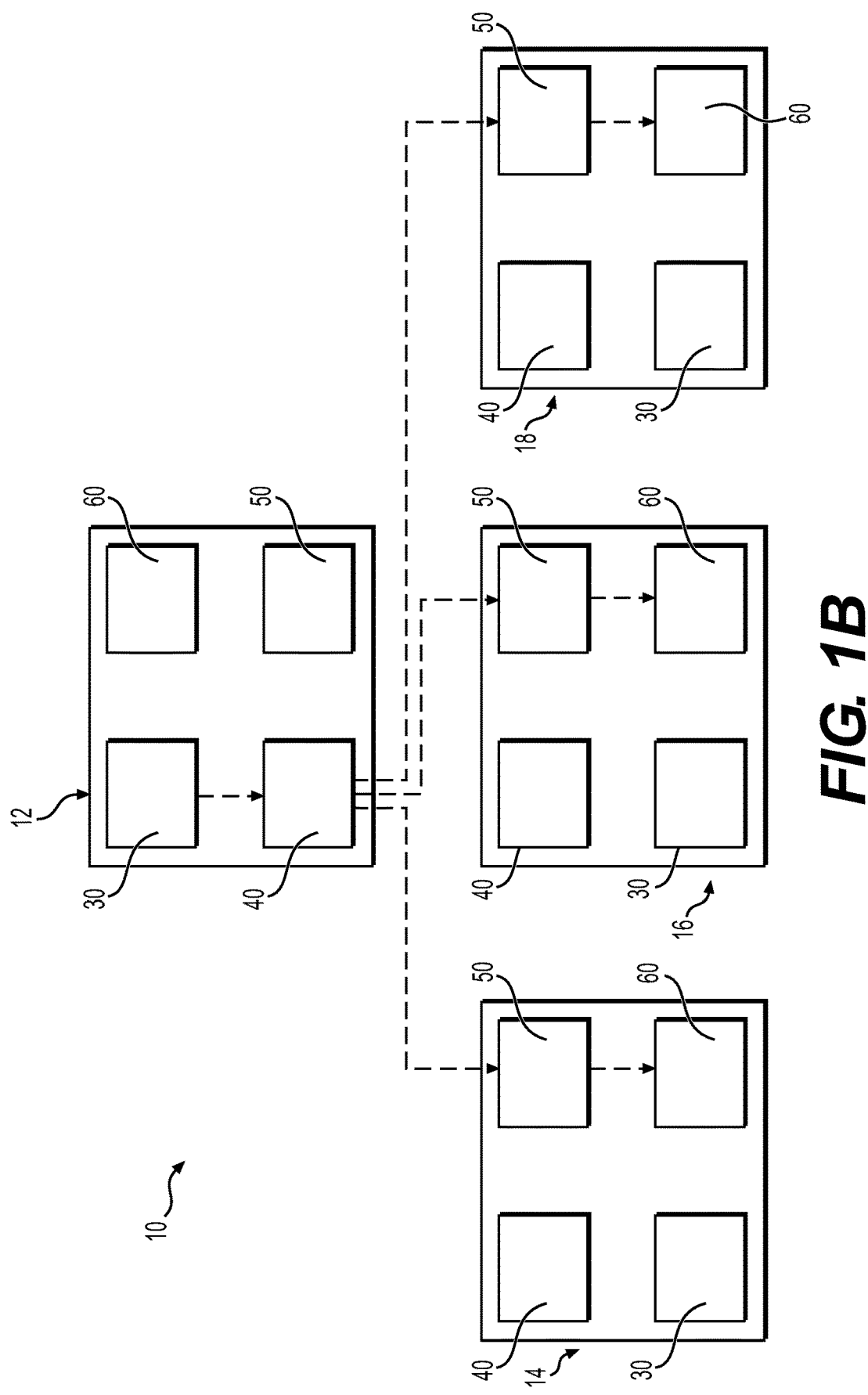
Figure 1C:
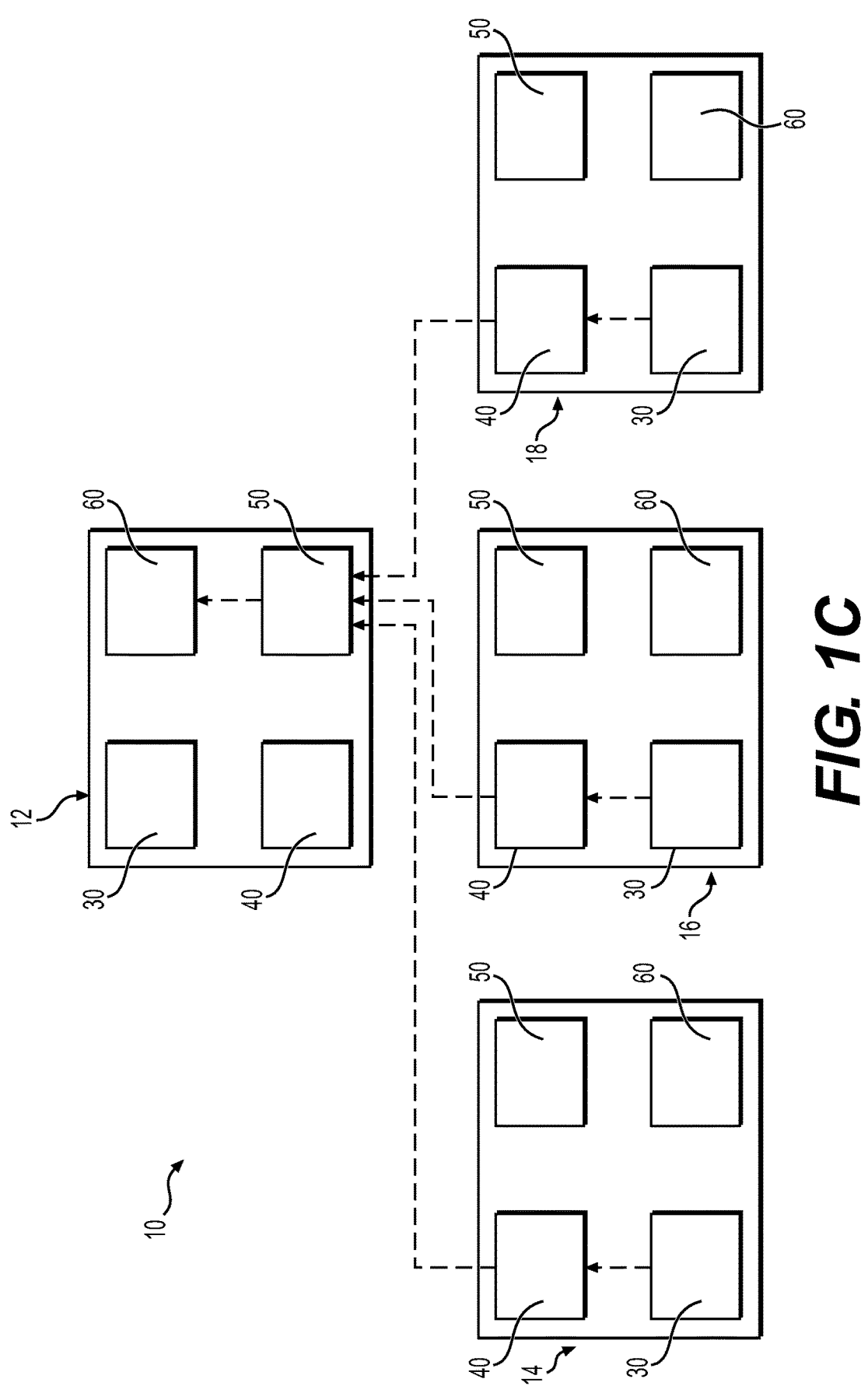

FIG. 1A depicts a schematic diagram of a system 10. System 10 may be associated with an environment such as, for example, an aircraft or other vehicle, or a building/site (e.g., manufacturing facility, military facility, transportation hub, office, warehouse, or any other type of site). The above examples are provided only for illustrative purposes, and system 10 may be in any suitable environment. System 10 may include a plurality of subsystems 12, 14, 16, 18. In the example of an aircraft, subsystems 12, 14, 16, 18 may include aircraft components including, for example, a flight management system ("FMS") or other cockpit system, ventilation system, bleed air system, air conditioning system, aircraft environment surveillance system ("AESS"), cabin pressure control system ("CPCS"), supplemental cooling system, auxiliary power unit ("APU"), radar, environmental control system ("ECS"), wheels and brakes, engines, or any other system, subsystem, or combination thereof. In FIG. 1B, subsystem 12 is depicted transmitting data, which is received by subsystems 14, 16, 18. In FIG. 1C, subsystem 12 is depicted receiving data from subsystems 14, 16, 18.

Each of subsystems 12, 14, 16, 18 may include an encoder 30, a transmitter 40, a receiver 50, and a local memory 60. Some of subsystems 12, 14, 16, 18 may include only a subset of the above elements, and subsystems 12, 14, 16, 18 also may include additional elements. Together, as described below, encoder 30, transmitter 40, receiver 50, and memory 60 may create and transmit sonic signals (e.g., ultrasonic signals), receive sonic (e.g., ultrasonic) signals, and store data from the received sonic (e.g., ultrasonic) signals. Where communications between elements is described herein, it will be appreciated that such communications may be direct or that additional, intermediate elements (not shown) may receive/transmit signals to/from the elements described herein.

FIG. 1B depicts subsystem 12 transmitting data relating to/reflecting a performance, status, etc. of subsystem 12. The discussion below also applies to operation of subsystems 14, 16, 18, unless otherwise specified. During operation of subsystem 12, subsystem 12 may generate data indicative of error(s), wear, performance trajectory, fault codes, etc. Subsystem 12 may store such data in, for example, a memory of subsystem 12 (e.g., memory 60 or another memory of subsystem 12). Some of such data may be transmitted to encoder 30. An element of subsystem 12 (e.g., a processor) may be configured to analyze the data to determine whether it is sufficiently important/critical (e.g., exceeds a criticality threshold or is of a predetermined category of data) to transmit to encoder 30 for eventual transmission to other subsystems 14, 16, 18. Because subsystem 12 may generate a very large amount of data, only data determined to be sufficiently important/critical may be transmitted to encoder 30. For example, data transmitted to encoder 30 may be data that is time-sensitive, has a substantial impact/implication for performance of subsystem 12, is indicative of trending toward a substantial impact on performance, etc. Encoder 30 may convert the data to data/a signal for ultrasonic transmission and/or may encrypt the data. For example, encoder 30 (or another element of subsystem 12) may utilize advanced encryption. Encoder 30 may transmit the encoded signal/data to transmitter 40.

Transmitter 40 may include a speaker or other device configured to transmit ultrasonic waves. Transmitter 40 may receive encoded data/signal from encoder 30. Transmitter 40 may perform additional processing on the data in order to convert it to an ultrasonic signal. Alternatively, encoder 30 may perform such steps to create the ultrasonic signal, or another component of subsystem 12 may perform such a step. Transmitter 40 may use ultrasonic data transfer technology to transfer the encrypted data.

As compared with other forms of data transmission, ultrasonic transfer may be more efficient, faster, and more secure. It may be low in cost to implement, with special hardware unnecessary. It may be associated with high security, verifying physical presence in compliance with synchronized channel averaging ("SCA") and/or enabling a session with out of band ("OOB") verification, thereby inhibiting man-in-the middle or other attacks. Ultrasonic transfer may be reliable, and the transfer components may always be turned on. Ultrasonic transfer may be operational where other forms of communication/transmission are unavailable. Ultrasonic transfer may be safe, with no electromagnetic radiation associated. A software solution for ultrasonic transfer may be implemented and executed across all operating systems and devices, creating cross-device flexibility. Ultrasonic technology may enable a seamless and consistent customer experience, across a number of different operating systems. Ultrasonic data transmission follows the characteristics of sound; therefore, it may bypass the physical limitations of other technologies (e.g., short range RF), extending a distance a data can travel to reach any device in short range with wireless transmission. Data over audio (e.g., ultrasonic transmission) may transmit data may employ industry-standard security/encryption methods or specialized security/encryption methods. A range or distance of travel of the ultrasonic transmission may be controlled by controlling a speed of the sound wave. A relatively slow speed of ultrasonic sound waves may present advantages.

As shown in FIG. 1B, receivers 50 of subsystems 14, 16, 18 may receive the encrypted data transmitted by transmitter 40 of subsystem 12. Receivers 50 may include, for example, microphones or other devices configured to receive ultrasonic data. Receivers 50 may transmit the received data to memories 60. Memories 60 may include, for example, non-volatile memory devices. The data may be stored in an encrypted form or may, alternatively, be unencrypted prior to storage. Memory 60 may include one or more data stores (e.g., databases). Receivers 50 or other elements of subsystems 14, 16, 18 may include programming (e.g., on a processor) having a communication protocol and/or algorithms that may filter the effects of environmental conditions (e.g., error, echo, masking, noise, and/or motion).

FIG. 1C depicts subsystem 12 receiving data from subsystems 14, 16, 18. The data transmissions from subsystems 14, 16, and 18 to subsystem 12, shown in FIG. 1C, may occur at different times and are shown on the same drawing for the purposes of showing that subsystem 12 may receive data from each of subsystems 14, 16, 18. Furthermore, subsystems 14, 16, and 18 also may transmit data to the other of subsystems 14, 16, and 18, but those transmissions are omitted on FIG. 1C for the ease of illustration. Encoder 30, transmitter 40, receiver 50, and memory 60 may operate as described above. For example, encoders 30 and transmitters 40 of subsystems 14, 16, and 18 may be operable to encode and transmit data. Receiver 50 and memory 60 of subsystem 12 may be operable to receive and store data.

As shown in FIG. 1C, a subsystem (e.g., subsystem 12) may be configured to receive data from multiple other subsystems (e.g., all of the other subsystems of system 10). Memory 60 of subsystem 12 may be configured to store data from any subsystem from which it has received data. For example, subsystem 12 may store data received from each of subsystems 14, 16, 18. When subsystem 12 is brought to a facility of a manufacturer/provider of system 10 (or a contractor of the manufacturer/provider) for repair, overhaul, maintenance, or other service (scheduled or unscheduled), the data from memory 60 may be downloaded and/or uploaded (e.g., to a server), as described in further detail below, with respect to FIG. 3. Thus, servicing of subsystem 12 may allow the manufacturer or other provider to access relevant data (e.g., critical data) for other subsystems 14, 16, 18, as well (e.g., for all subsystems of an environment in which subsystem 12 was installed).

Figure 2:
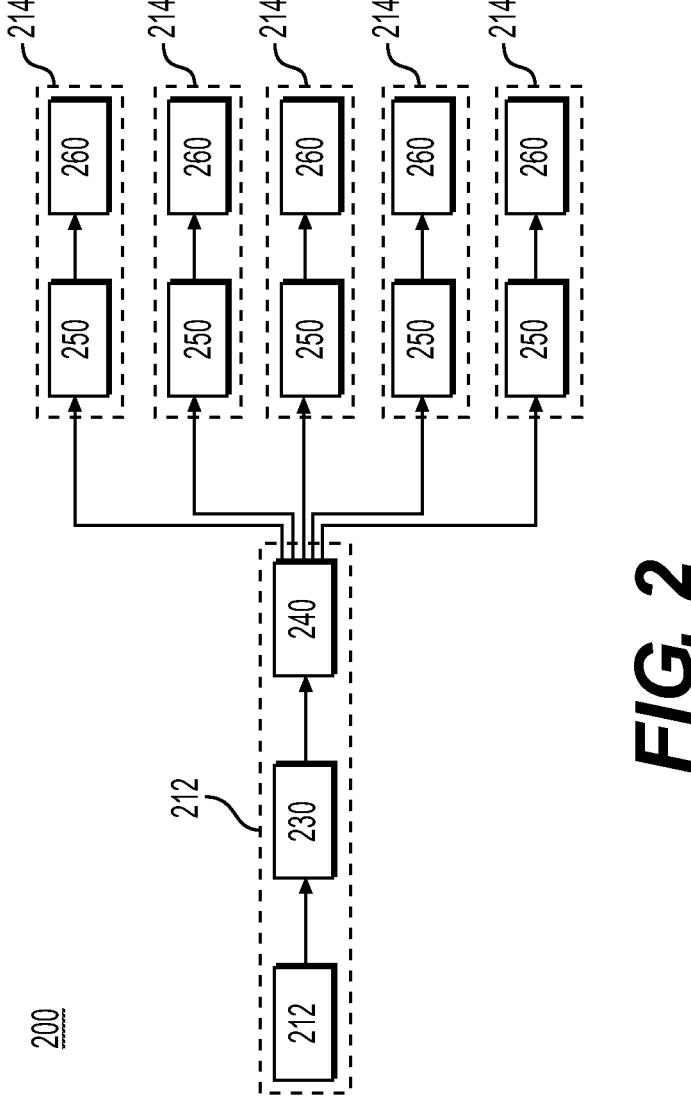
FIG. 2 depicts an exemplary flow of data through a system such as the system of FIGS. 1A-1C.

FIG. 2 depicts a flow 200 of information through a system such as system 100 (FIGS. 1A-1C). Flow 200 depicts information flowing from a transmitting subsystem 212 to one or more receiving subsystems 214. Although FIG. 2 depicts 5 receiving subsystems 214, it will be appreciated that the disclosure encompasses any number of receiving subsystems 214. Transmitting subsystem 212 and receiving subsystem 214 may have any of the properties of subsystems 12, 14, 16, 18 of system 10.

As shown in FIG. 2, a module of transmitting subsystem 212, such as a memory 213 may originate data to be transmitted. Memory 213 may have any suitable properties and may include random access memory (RAM) and/or a hard drive. Alternatively, a memory such as memory 60 of FIGS. 1A-1C may be used to store data to be transferred, as well as data received from other subsystems. Memory 213 may receive from other elements of transmitting subsystem 212 data indicative of a status of subsystem 212 (e.g., a fault or a trend toward a fault (or other type of data)). As discussed with respect to system 10, an element of transmitting subsystem 212 (e.g., a processor) may determine that the data warrants transmission to receiving subsystems 214. For example, data may be determined to be critical. In some examples, data may be compared to criteria, such as categories or thresholds, to determine whether the data warrants transmission.

Memory 213 may transmit data to an encoder 230, which may have any of the features of encoder 30 (FIGS. 1A-1C). Encoder 230 may transmit data to a transmitter 240, having any of the properties of transmitter 40 (FIGS. 1A-1C). Receivers 250 (having any property of receiver 50 of system 10) of one or more receiving subsystems 214 may receive an ultrasonic transmission from transmitter 240. Receivers 250 may have any of the properties of receiver 50 (FIGS. 1A-1C). Receivers 50 may transmit data to respective memories 260 of receiving subsystems 214. Memories 260 may have any of the properties of memory 60 (FIG. 1A-1C).

Figure 3:
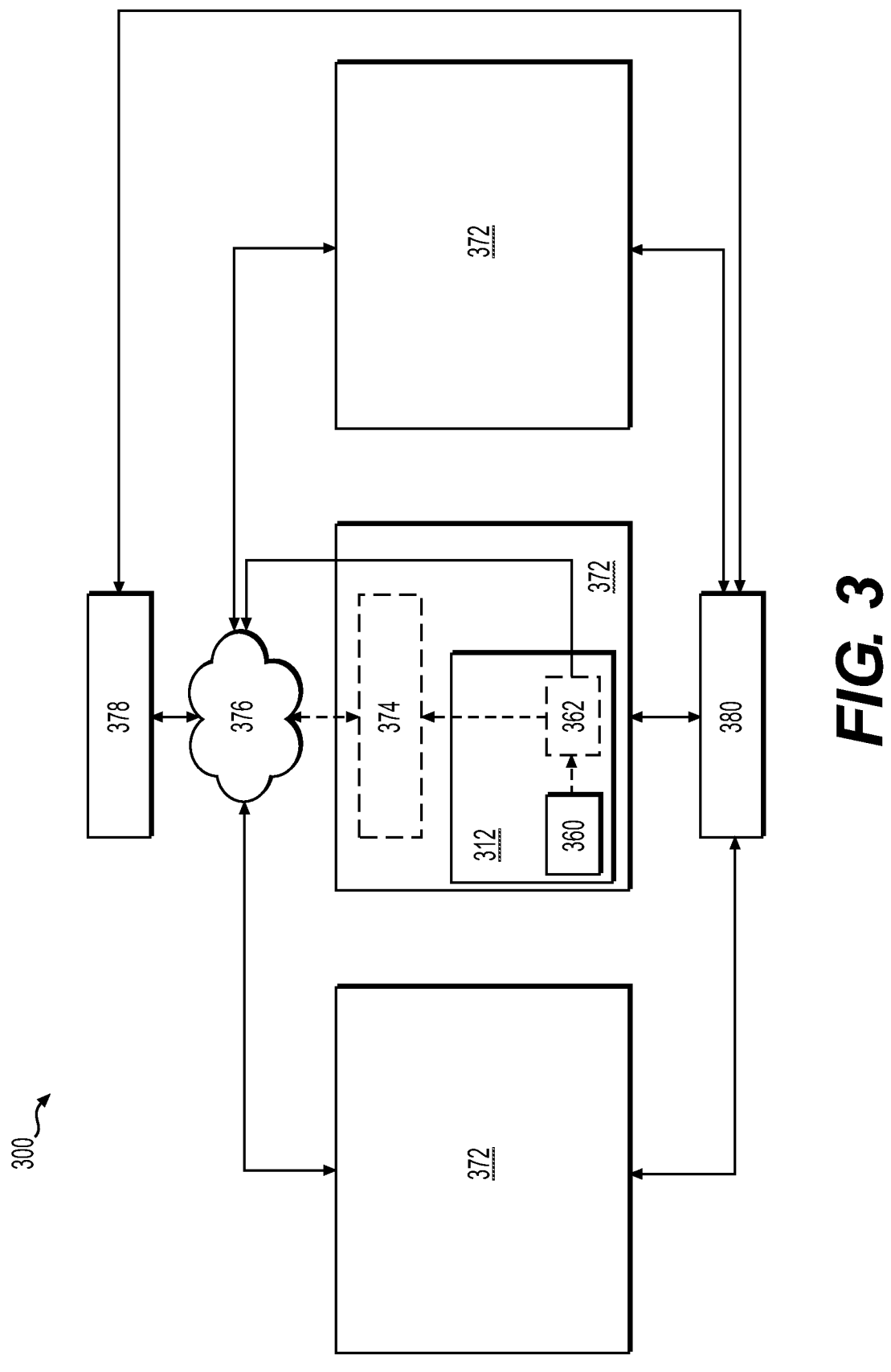
FIG. 3 is a flow diagram of steps of the method of FIG. 1.

FIG. 3 depicts a schematic illustration of a system 300 for receiving information stored by a subsystem, including the information stored about other subsystems. As shown in FIG. 3, a subsystem 312 may be received in a facility 372. Subsystem 312 may upload data to a server 378 (e.g., via a network 376). Server 378 (or an operator of server 378) and/or facility may share information with an operating party/operator 380, which may own, lease, possess, and/or operate equipment for which data was stored on subsystem 312.

Subsystem 312 may have any of the properties of subsystems 12 or 212. Subsystem 312 may include a memory 360, having any of the properties of memories 60, 260. When subsystem 312 is at facility 372 for repair, maintenance, overhaul, or other servicing, information stored on subsystem 312 (e.g., on memory 360) may be accessed. As discussed above with respect to system 10, data stored on memory 360 may be encrypted. Subsystem 312 may optionally include a decryption module 362 (including, e.g., a processor—which may also be used for other purposes—or other component). Decryption module 362 may be programmed with instructions for decrypting encrypted data stored in memory 360. Alternatively, a computer 374 of facility 372 or server 378 may be associated with (e.g., include) a processor having instructions for decrypting data received from memory 360.

Facility 372 may be a physical repair/overhaul facility but is not so limited. Facility 372 may include any physical or virtual location where subsystem 312 is repaired, overhauled, and/or maintained. Facility 372 may include, for example, a virtual environment or even a physical location where subsystem 312 is installed and operational, in which subsystem 312 also may be repaired. Services at facility 372 may be performed by a manufacturer/provider of subsystem 312 or by a contracted party (e.g., a third party).

A computer of facility 372 may download data from subsystem 312 and/or subsystem 312 may upload data to server 378, e.g., via network 376. Network 376 may be any type of communications network, including, but not limited to, a Local Area Network ("LAN"), Wide Area Network ("WAN"), and/or the Internet. The data uploaded/downloaded may include data relating to other subsystems (not shown in FIG. 3). For example, subsystem 312 may be an element of a system such as system 10, having a plurality of subsystems, and subsystem 312 may receive data from other subsystems, as described above with respect to FIGS. 1A-2. Server 378 may be a server of, for example, a manufacturer or other provider of subsystem 312 and/or the subsystems for which subsystem 312 stores data. The uploaded/downloaded data also may include data pertaining to subsystem 312 itself. Such data related to subsystem 312 may be stored in memory 360 or in another component of subsystem 312 (e.g., a memory similar to memory 213 of FIG. 2).

As shown in FIG. 3, server 378 may be in communication with multiple facilities 372 (e.g., via network 376). Server 378 may receive data from subsystems received in any of facilities 372. Server 378 may share information pertaining to subsystem 312 with other facilities 372. For example, subsystem 312 may be received in a facility 372 that services subsystems of a particular type (e.g., engines and APUs). Subsystem 312 may have stored therein information pertaining to a subsystem of another type (e.g., a mechanical system). Server 378 may provide information related to the other type of subsystem (e.g., the mechanical system) to a facility 372 that services (e.g., maintains, repairs, or overhauls) mechanical systems.

Server 378 and/or facilities 372 may be in communication with an entity such as an operator 380, either directly (as shown) or via network 376. Operator 380 may operate, possess, use, or otherwise be involved with a subsystem for which subsystem 312 stored and uploaded information. For example, operator 380 may be an entity such as an airline. Server 378 (or an operator of server 378) and/or facilities 372 (or another, un-depicted party) may contact operator 380 to inform operator 380 that equipment (e.g., a subsystem of system 10) requires maintenance, repair, or overhaul. Additionally or alternatively, server 378/an operator of server 378 and/or facilities 372 may inform operator 380 of potential threats (delays and cancellations, unscheduled removals, aircraft on ground ("AOG"), etc.). Server 378/an operator of server 378 and/or facilities 372 may request and/or receive data from operator 380 for further analysis and preventive measures. Data may be provided to operator 380 via a communication (e.g., personnel associated with facilities 372 and/or an operator of server 378 may contact operator 380 by message, phone call, etc.) or data transfer (e.g., data relating to a subsystem of system 10 may be transmitted to operator 380). Data may be provided to operator 380 by with facilities 372 and/or an operator of server 378 automatically or manually.

Figure 4:
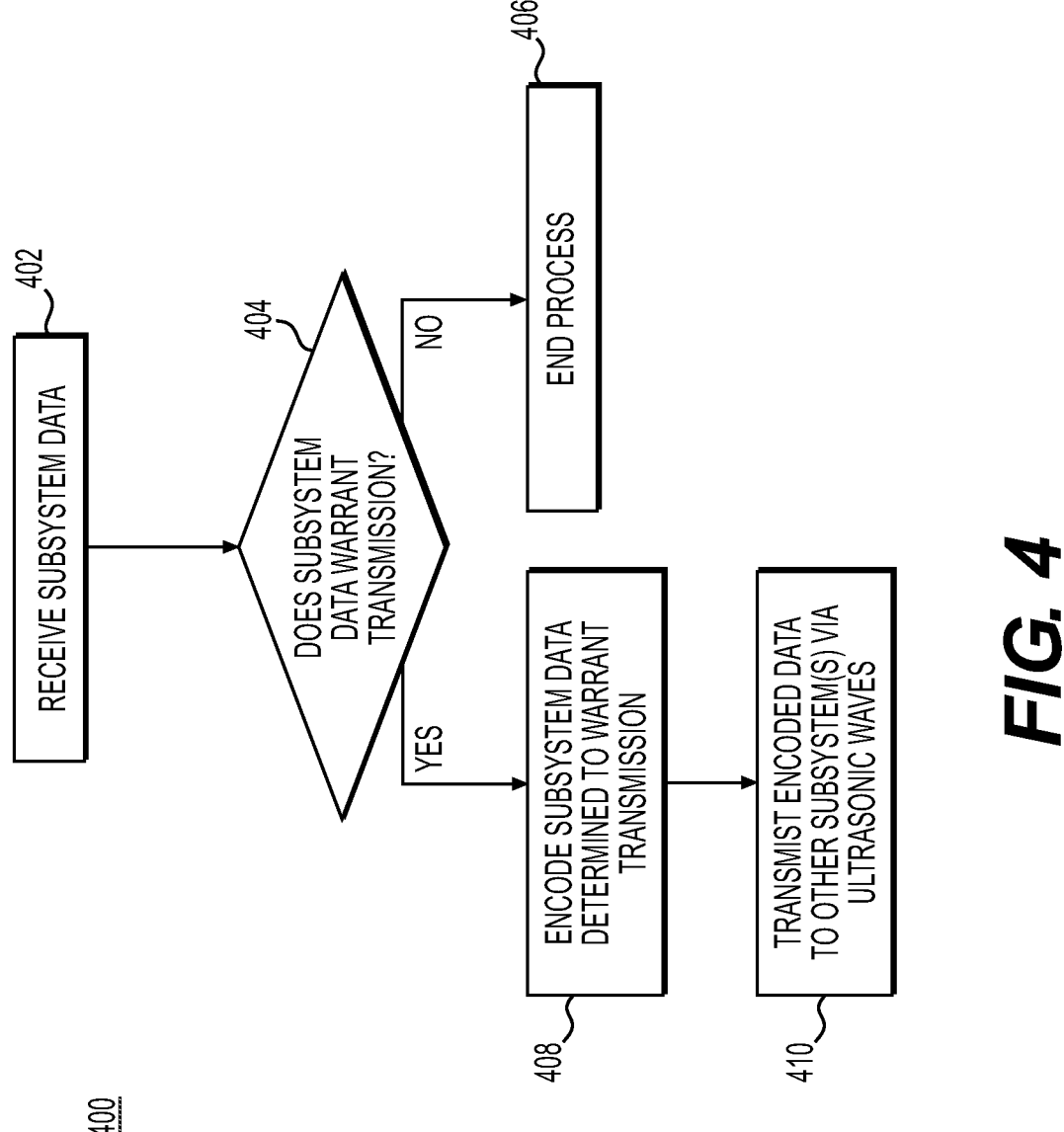
FIGS. 4-7 depict methods performed by systems such as the system of FIGS. 1A-1C.

FIGS. 4-7 depict various methods associated with the systems and data flows described above. FIG. 4 depicts a method 400 for transmitting data. Exemplary components of system 10, 300 or flow 200 that may perform each step are provided below, but it will be appreciated that method 400 is not limited to such components. In step 402, subsystem data may be received. For example, step 402 may include receiving by an encoder 30 data pertaining to a subsystem 12. Subsystem data may be received from, for example, a memory such as memory 213 (FIG. 2).

In step 404, it may be determined whether the subsystem data warrants transmission. As discussed above, such a step may be performed by, for example, encoder 30 or another element of subsystem 12 (e.g., a processor). Step 404 may include, for example, determining whether the subsystem data is critical and may include characterizing a category of subsystem data or comparing the subsystem data to one or more thresholds. Further details of such determinations are discussed above. If the subsystem data does not warrant transmission, method 400 may end in step 406.

If the subsystem data warrants transition, then the subsystem data may be encoded in step 408. Step 408 may include, for example, encryption of the subsystem data and encoding the subsystem data so that it may be transmitted in an ultrasonic signal/transmission. An element such as encoder 30 may perform step 408 alone or in conjunction with other components (e.g., additional processor(s)). Further detail of encoding is provided above. In step 410, the encoded data may be transmitted to other subsystems via ultrasonic waves. For example, transmitter 40 may transmit the encoded data, as described above.

Figure 5:
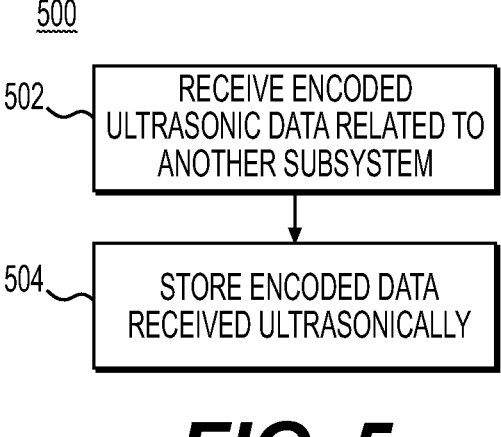

FIG. 5 depicts an exemplary method 500 for receiving and storing data. In step 502, an ultrasonic signal encoding data relating to another subsystem may be received. For example, a receiver 50 of system 10 may receive the ultrasonic signal, as discussed above. In step 504, the encoded data from the received ultrasonic signal may be stored. For example, the data may be stored in memory 60. As discussed above, data stored in memory 60 may be stored in an encrypted format. Additionally or alternatively, a component (such as a component of subsystem 14, 16, 18) may decrypt the data before storing the data in memory 60. For example, a processor of subsystem 14, 16, 18 may decrypt the data.

Figure 6:
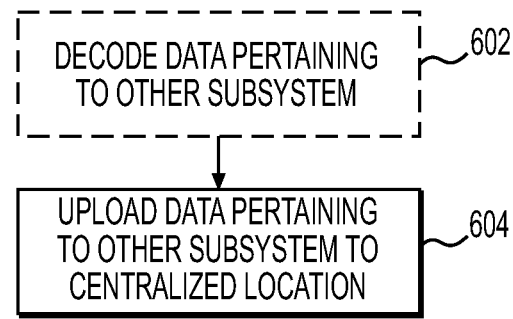

FIG. 6 depicts a method 600 for uploading data. Method 600 may be performed in the system 300 of FIG. 3, for example. Prior to uploading the data, in step 602, an element (e.g., decryption module 362) of a subsystem (e.g., subsystem 312) may optionally decrypt encrypted data stored in, for example, memory 360. In step 604, subsystem 312 may upload the data pertaining to other subsystem(s) to a centralized location, such as server 378. As described above, the data may be uploaded via network 376 (directly or indirectly, via, e.g., computer 374).

Figure 7:
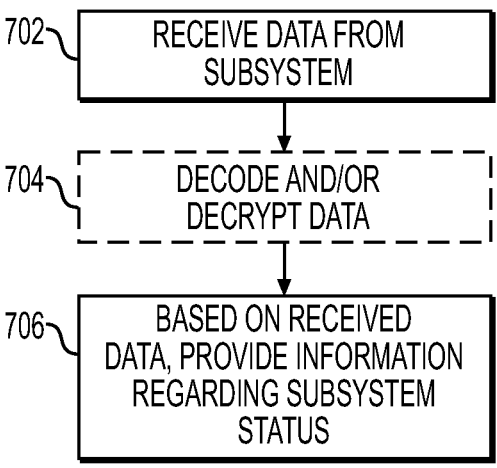

FIG. 7 depicts a method 700 for receiving data pertaining to a subsystem. Steps of method 700 may be performed by components of system 300, for example. In step 702, data pertaining to other subsystem(s) may be received from a subsystem, such as subsystem 312 received in a facility 372. Step 702 may be performed by one or more of, for example, computer 374, network 376, and/or server 378. In step 704, if the received data is encrypted or encoded, the data may optionally be decoded and/or decrypted by, for example, computer 374, server 378, or another component. In step 706, based on contents of the received data, information may be provided regarding a subsystem status. For example, as described above, with respect to FIG. 3, data may be provided to other facilities 372 and/or an operator 380 by, for example, server 378 or facilities 372.

Figure 8:
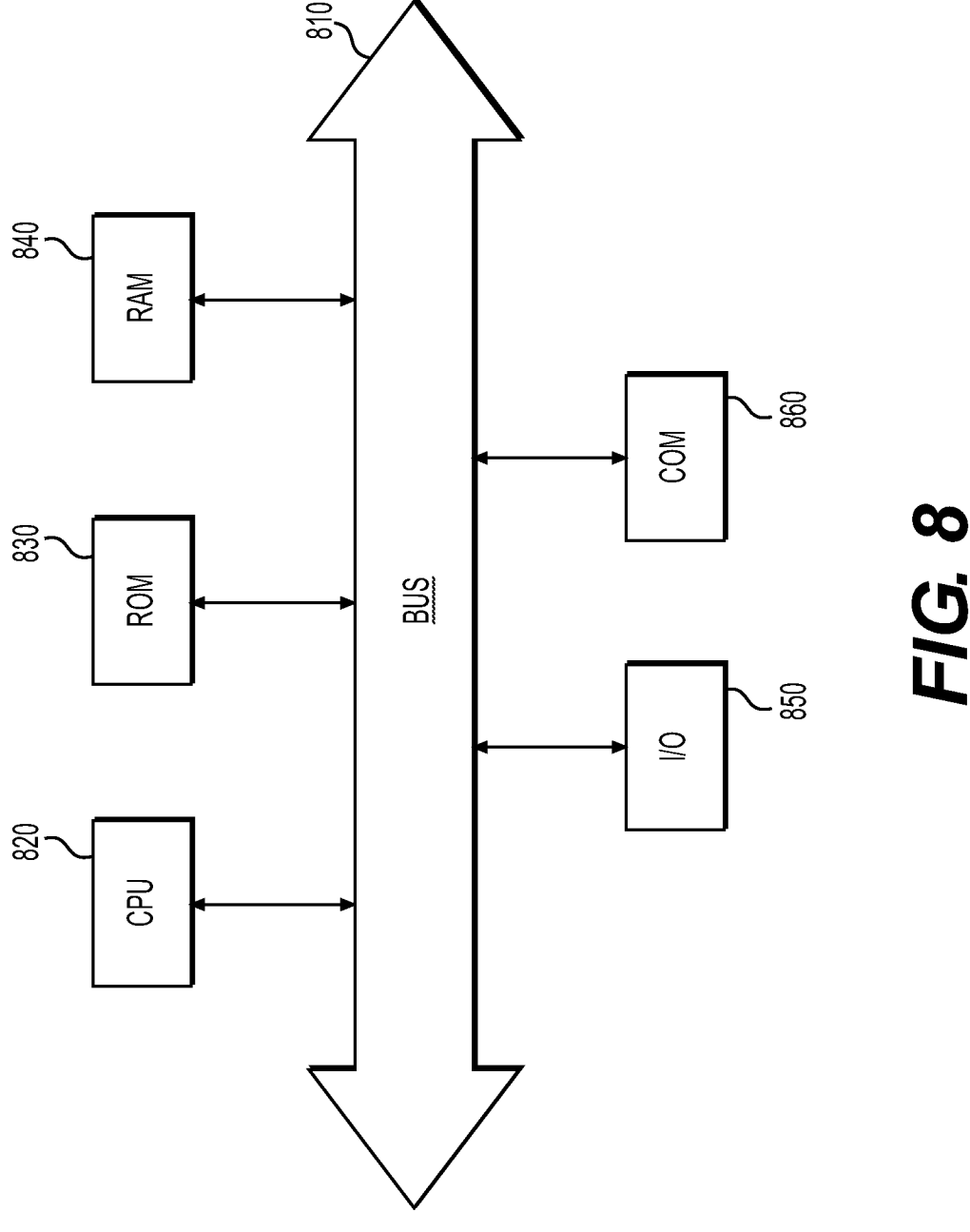
FIG. 8 depicts a computer system.

FIG. 8 depicts an example system that may execute techniques presented herein. FIG. 8 is a simplified functional block diagram of a computer that may be configured to execute techniques described herein, according to exemplary embodiments of the present disclosure. Specifically, the computer (or "platform" as it may not be a single physical computer infrastructure) may include a data communication interface 860 for packet data communication. The platform may also include a central processing unit ("CPU") 820, in the form of one or more processors, for executing program instructions. The platform may include an internal communication bus 810, and the platform may also include a program storage and/or a data storage for various data files to be processed and/or communicated by the platform such as ROM 830 and RAM 840, although the system 800 may receive programming and data via network communications. The system 800 also may include input and output ports 850 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for data transfer, comprising:
a plurality of subsystems, each including an encoder, a transmitter configured to transmit ultrasonic signals, a receiver configured to receive ultrasonic signals, and a local memory;
wherein a first subsystem of the plurality of subsystems is configured to:
encrypt data relating to a status of the first subsystem;
encode, using the encoder, the encrypted data relating to the first subsystem status to an ultrasonic signal;
transmit, using the transmitter, the ultrasonic signal relating to the first subsystem status to at least one other subsystem of the plurality of subsystems;
wherein the at least one other subsystem of the plurality of subsystems that is different from the first subsystem is configured to:
receive, using the receiver, one or more ultrasonic signals from the first subsystem and each subsystem different from the first subsystem and the at least one other subsystem, the one or more ultrasonic signals relating to respective subsystem statuses of the first subsystem and the each subsystem;
store, in the local memory, the received one or more signals; and
transfer, to a server, data regarding the first subsystem status and the other subsystem statuses.

2. The system of claim 1, wherein the transmitter includes a speaker.

3. The system of claim 2, wherein the receiver includes a microphone.

4. The system of claim 1, wherein each of the plurality of subsystems also includes a processor configured to execute one or more algorithms in order to filter the received one or more signals.

5. The system of claim 1, wherein each subsystem further includes a processor configured to determine whether a first subsystem status is sufficiently critical to be transmitted.

6. The system of claim 1, wherein each subsystem further includes a decryption module configured to decrypt the one or more received signals.

7. The system of claim 1, wherein each of the plurality of subsystems is a component of an aircraft.

8. The system of claim 1, wherein each of the other of the plurality of subsystems is configured to receive the ultrasonic signal relating to the first subsystem status.

9. A system for data transfer, comprising:
a first subsystem, including a first encoder and a first transmitter configured to transmit ultrasonic signals;
a second subsystem, including a first receiver configured to receive ultrasonic signals, and a first local memory; and
a third subsystem, including a second receiver configured to receive ultrasonic signals, and a second local memory;
wherein the first subsystem is configured to:
encrypt data relating to first subsystem status of the first subsystem;
encode, using the first encoder, the encrypted data relating to the first subsystem status to a first ultrasonic signal; and
transmit, using the first transmitter, the first ultrasonic signal relating to the first subsystem status;
wherein the second subsystem is configured to receive, using the first receiver, the transmitted first ultrasonic signal relating to the first subsystem status and store, in the first local memory, data relating to the received first ultrasonic signal; and
wherein the third subsystem is configured to receive, using the second receiver, the transmitted first ultrasonic signal relating to the first subsystem status and store, in the second local memory, data relating to the received first ultrasonic signal.

10. The system of claim 9, wherein each of the second subsystem and the third subsystem is configured to transfer, to a server, data regarding the first subsystem status.

11. The system of claim 9, wherein the first subsystem further includes a third receiver configured to receive ultrasonic signals, and a third local memory, wherein the second subsystem further includes a second encoder and a second transmitter configured to transmit ultrasonic signals;
wherein the second subsystem is configured to:
encrypt data relating to second subsystem status of the second subsystem;
encode, using the second encoder, the encrypted data relating to the first subsystem status to an ultrasonic signal; and
transmit, using the second transmitter, the ultrasonic signal relating to the second subsystem status;
wherein the first subsystem is configured to receive, using the third receiver, the transmitted second ultrasonic signal relating to the second subsystem status and store, in the third local memory, data relating to the received second ultrasonic signal; and
wherein the third subsystem is configured to receive, using the second receiver, the transmitted second ultrasonic signal relating to the second subsystem status and store, in the second local memory, data relating to the received second ultrasonic signal.

12. The system of claim 9, wherein the first transmitter includes a speaker.

13. The system of claim 12, wherein each of the second receiver and the third receiver includes a microphone.

14. The system of claim 9, wherein each of the second subsystem and the third subsystem also includes a processor configured to execute one or more algorithms in order to filter the received one or more signals.

15. The system of claim 9, wherein the first subsystem further includes a processor configured to determine whether a first subsystem status is sufficiently critical to be transmitted.

16. The system of claim 9, wherein each of the second system and the third subsystem further includes a decryption module configured to decrypt the one or more received signals.

17. The system of claim 9, wherein each of the first subsystem, the second subsystem, and the third subsystem is a component of an aircraft.

18. A method of data transfer, including:

encrypting, by a first subsystem of a system, data relating to a health or performance status of the first subsystem;

encoding, by an encoder of the first subsystem, the encrypted data relating to the subsystem status to an ultrasonic signal; and transmitting, using a microphone of the first subsystem, an ultrasonic signal relating to the first subsystem status to at least one subsystem of the plurality of subsystems of the system that is different from the first subsystem.

19. The method of claim 18, wherein the subsystem is a component of an aircraft.

20. The method of claim 18, further comprising determining whether a first subsystem status is sufficiently critical to be transmitted.

* * * * *